Feb. 18, 1930.  W. J. SHEIRS  1,747,190
AUTOMOBILE CLUTCH CONTROL MECHANISM
Filed Oct. 26, 1926
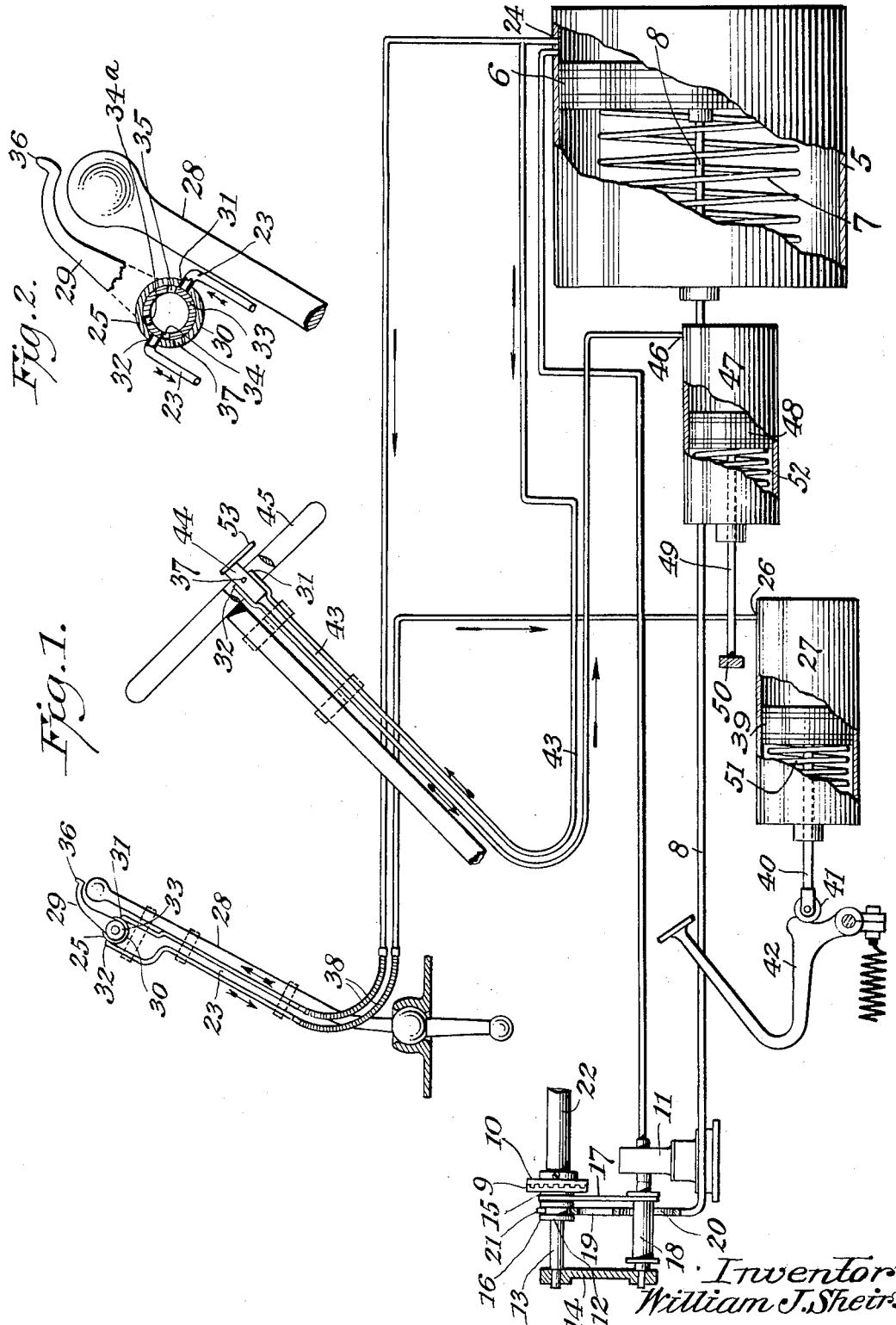
Inventor,
William J. Sheirs
By A. R. Appleman,
Attorney.

Patented Feb. 18, 1930

1,747,190

UNITED STATES PATENT OFFICE

WILLIAM J. SHEIRS, OF BROOKLYN, NEW YORK

AUTOMOBILE CLUTCH-CONTROL MECHANISM

Application filed October 26, 1926. Serial No. 144,301.

This invention relates to automobile clutch control mechanism and has particular reference to means carried by the gear shift lever of a car whereby the clutch may be controlled. The object being to provide a device of the above character which shall perform its work in an effective and expeditious manner.

An important feature of this invention resides in the construction and position of the valve in a clutch control air line. This valve should be carried rigidly on the gear shift lever in such position that the operator cannot shift the gears before the valve is depressed or operated, and the clutch thrown out.

The invention has for its further objects to provide certain other features, all of which will be hereinafter pointed out.

In order that the invention may be clearly understood and readily carried into effect, the same will now be described more fully in detail with reference to the accompanying drawings illustrating a preferred embodiment thereof, in which:

Figure 1 is a general diagrammatic side elevation of the invention, parts being in section to more clearly disclose the construction.

Fig. 2 is an enlarged detail sectional side elevation of a valve which may be employed in the clutch control air line.

Referring to the drawings, in the main compressed air reservoir, 5, is placed a piston 6, backed by a pressure equalizing spring 7. The piston 6, is connected through a rod 8, to a clutch member 9 co-acting with a companion member 10, to control the operation of an air compressor 11, and automatically maintain a desired pressure in the reservoir 5.

The clutch member 9 is carried on a hub 12 loose on a shaft 13 which is fixed in a stationary frame 14 arranged as desired. The hub 12, may comprise two grooved pulleys 15 and 16, the former being adapted to receive an endless belt 17 which is passed down and around an elongated pulley 18. This belt is round in cross section so that in the operation of the device when the clutch member 9 is thrown out of engagement with clutch member 10 to stop the air compressor, the belt will roll along this elongated pulley causing no drag or retardation of the parts.

The remote end of the piston rod 8 is turned up as at 19, and is formed with a loop 20, to straddle the elongated pulley, and with a terminal shift fork 21, to engage the groove of the pulley 16.

The clutch member 10, is keyed to the fan shaft 22 of the engine and, of course, is rotated when the engine is running.

The above described mechanism constitutes the air pressure control means for the main reservoir.

In the position of the parts as shown, the piston 6, of the reservoir has been forced to the right by the spring 7, the pressure at the opposite side of the piston being at a point when increased pressure is needed, the piston 6, through the rod 8, has drawn clutch members 9 and 10 into engagement to operate the air compressor and build up a desired pressure in the reservoir and when such pressure is present in the reservoir it will overpower the spring 7, thus forcing the piston and its associated parts to the left and separate the clutch elements 9 and 10 to stop the air compressor.

The engine clutch control means may comprise an air line 23, starting from the reservoir at 24, passing through a valve 25, and returning as at 26, to an auxiliary cylinder 27. The engine clutch air control, valve 25 is fixedly secured to the gear shift lever 28, in such position that the handle of said lever cannot be grasped to shift the gears without grasping the valve operating handle 29 to first throw the clutch out. A preferred form of clutch control valve is shown in Fig. 2 of the drawings and may comprise a casing 30, having air tube connections 31 and 32. A valve sleeve 33 is mounted to be turned in said casing 30, by the handle 29, and it is provided with opposite ports 34 and 35 which when the handle 29 is tilted against the knob of the gear shift lever 28, will register with the air tube connections 31 and 32 and establish the air line, after which the air line may be broken by pressing back on the finger piece 36, on handle 29 to cause port 34, in sleeve 33 to register with a port 37 in the casing 30 and a port 34ª in the said sleeve to register with the tube connection 32. If the air tubes used are of a rigid character, flexible couplings should be employed at 38, to permit of free manipulation of the shift lever 28.

The auxiliary cylinder 27 contains a piston 39 from which a piston rod 40, projects forwardly through the end of the cylinder and carries a roller 41, bearing against a shoulder of the usual clutch pedal 42.

The emergency brake air line 43 starts at 24, from the reservoir 5, passes through a valve 44, conveniently placed on the steering wheel 45 and returns as at 46 to an auxiliary cylinder 47, containing a piston 48 having a rod 49, projecting forwardly through the end of the cylinder and connected to the cross brake beam 50, of the car.

The auxiliary cylinders 27 and 47 each contain an equalizing spring 51 and 52 respectively, which are placed between the pistons and the front end walls of said cylinders.

The valve 44 in the emergency brake air line is operated by a horizontally extending handle 53 so that better control of the air is achieved to avoid sudden ingress of air and consequent too sudden application of the brakes. Otherwise the construction of the valves are practically the same and a detailed description of valve 44 is deemed unnecessary as like parts of the said valves bear corresponding reference characters.

The invention is not limited to any particular physical embodiment; but on the contrary is susceptible of being expressed in different structures and forms, and certain of its features may be employed to the exclusion of others, without departing from the spirit of the invention.

What I claim and desire to secure by Letters Patent is:—

1. An automatic control for automobiles having the usual gear shift lever and clutch pedal, an air controlled piston having a rod contacting with said pedal, a valve attached to said gear shift lever at the top thereof, a compressed air tank, an air line connected to said tank, extending through said valve and thence to the rear of said piston, said valve having a handle so positioned with respect to the knob of said gear shift lever, that both must be grasped to establish the air line before the gear shift takes place.

2. An automatic control for automobiles having the usual clutch pedal and gear shift lever, a valve on said shift lever, a piston having a rod in contact with said pedal, a compressed air line connected with said valve and extended to the rear of said piston, said valve being provided with an air controlling handle, so positioned with respect to the knob of said shift lever that both must be grasped to effect a shifting movement of the gears.

In testimony whereof, I have signed my name to this specification this 19th day of October, 1926.

WILLIAM J. SHEIRS.